United States Patent [19]
Kyriacou

[11] 3,888,868
[45] June 10, 1975

[54] PREPARATION OF CHLOROPYRIDYLSULFONE-N-OXIDES

[75] Inventor: Demetrios Kyriacou, Clayton, Calif.

[73] Assignee: The Dow Chemical Company, Midland, Mich.

[22] Filed: Dec. 17, 1973

[21] Appl. No.: 425,571

[52] U.S. Cl..... 260/294.8 F; 260/294.8 G; 424/263
[51] Int. Cl............................................. C07d 31/48
[58] Field of Search ............... 260/294.8 F, 294.8 G

[56] References Cited
OTHER PUBLICATIONS
Klingsberg, Pyridine and Its Derivatives, Interscience, Part 2, Pages 97–114, (1961) QD 401 K.5 C.2.

*Primary Examiner*—Alan L. Rotman
*Attorney, Agent, or Firm*—S. Preston Jones

[57] ABSTRACT
Compounds corresponding to the formula

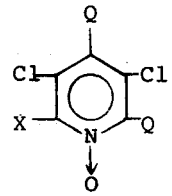

wherein X represents hydrogen or chloro and each Q represents hydrogen, chloro or loweralkylsulfonyl ($-SO_2R$, wherein R represents a straight or branched chain loweralkyl radical of from one to four carbon atoms), with the proviso that at least one Q is always loweralkylsulfonyl are prepared by the direct oxidation of an alkylthio or alkylsulfonyl substituted polychloropyridine with hydrogen peroxide and sulfuric acid. These compounds have utility as fungicides and bactericides.

6 Claims, No Drawings

PREPARATION OF CHLOROPYRIDYLSULFONE-N-OXIDES

SUMMARY OF THE INVENTION

The present invention is directed to the preparation of chloropyridylsulfone-N-oxides by the direct oxidation of an alkylthio or alkylsulfonyl substituted polychloropyridine.

The compounds prepared by the present process are compounds which correspond to the formula

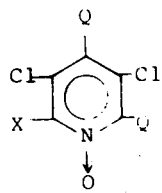

wherein X represents hydrogen or chloro and each Q represents hydrogen, chloro or loweralkylsulfonyl ($-SO_2R$, wherein R represents a straight or branched chain loweralkyl radical of from one to four carbon atoms), with the proviso that at least one Q is always loweralkylsulfonyl.

The pyridine N-oxides prepared by the process of the present invention are crystalline solids which are of low solubility in water and of moderate solubility in many common organic solvents; they are useful for the kill and control of many bacterial and fungal organisms including such as, for example, *Staphylococcus aureus, Candida albicans, Trichophyton mentagrophytes, Bacillus subtilis, Aspergillus terreus, Candida pelliculosa, Rhizopus nigricans* and downy mildew.

Representative pyridine-N-oxides prepared by the process of the present invention include;

2,3,5-trichloro-4-(methylsulfonyl)pyridine-N-oxide;
2,3,5-trichloro-4-(ethylsulfonyl)pyridine-N-oxide;
2,3,5-trichloro-4-(n-propylsulfonyl)pyridine-N-oxide;
2,3,5-trichloro-4-(isopropylsulfonyl)pyridine-N-oxide;
2,3,5-trichloro-4-(n-butylsulfonyl)pyridine-N-oxide;
2,3,5-trichloro-4-(sec-butylsulfonyl)pyridine-N-oxide;
3,5-dichloro-4-(methylsulfonyl)pyridine-N-oxide;
3,5-dichloro-2-(methylsulfonyl)pyridine-N-oxide;
3,5-dichloro-2,4-bis(methylsulfonyl)pyridine-N-oxide;
3,5,6-trichloro-2,4-bis(methylsulfonyl)pyridine-N-oxide;
3,5,6-trichloro-2,4-bis(ethylsulfonyl)pyridine-N-oxide;
3,5,6-trichloro-2,4-bis(n-butylsulfonyl)pyridine-N-oxide;
3,5-dichloro-2,4-bis(methylsulfonyl)pyridine-N-oxide;
3,5-dichloro-2,4-bis(sec-butylsulfonyl)pyridine-N-oxide;
3,5-dichloro-4-(n-butylsulfonyl)pyridine-N-oxide;
2,3,5,6-tetrachloro-4-(methylsulfonyl)pyridine-N-oxide;
2,3,5,6-tetrachloro-4-(n-propylsulfonyl)pyridine-N-oxide;
2,3,5,6-tetrachloro-4-(sec-butylsulfonyl)pyridine-N-oxide;
3,4,5,6-tetrachloro-2-(methylsulfonyl)pyridine-N-oxide;
3,4,5,6-tetrachloro-2-(n-butylsulfonyl)pyridine-N-oxide;
3,5,6-trichloro-2-(methylsulfonyl)pyridine-N-oxide and
3,5,6-trichloro-2-(n-butylsulfonyl)pyridine-N-oxide.

The chloropyridinesulfone-N-oxides are prepared in high yield and in high purity by a method which comprises reacting an appropriate alkylthio or alkylsulfonyl substituted polychloro pyridine with a mixture of concentrated sulfuric acid and hydrogen peroxide at a temperature of from about 45° to about 75°C.

The concentrated sulfuric acid useful in the present invention has an $H_2SO_4$ content of from about 85 to about 98 percent by weight. The hydrogen peroxide useful in the present invention is in the form of an aqueous solution, and preferably contains from about 30 to about 60 percent by weight of $H_2O_2$. Hydrogen peroxide solutions having concentrations of up to 95 percent by weight of $H_2O_2$ can be employed but they are less preferred as they are more easily decomposed and more hazardous.

The present method has two major advantages: (a) the overall oxidation chemistry is simple and relatively inexpensive and product recovery is very easy and (b) the potential recovery of the sulfuric acid is quite feasible using known techniques of sulfuric acid reconcentration and the potential hazards in using hydrogen peroxide is minimized because of the relatively dilute hydrogen peroxide employed.

In carrying out this reaction, an appropriate alkylthio or alkylsulfonyl substituted polychloro pyridine is first dissolved in the concentrated sulfuric acid and the aqueous hydrogen peroxide is slowly added thereto. Since hydrogen peroxide tends to decompose quite rapidly in this system at temperatures above 75°C., the peroxide addition and the subsequent reaction are carried out under constant agitation and with adequate temperature control. The hydrogen peroxide is added to the mixture in at least a stoichiometric amount or in an amount of 1 mole of hydrogen peroxide for each oxygen atom to be added to the starting compound.

The reaction is usually substantially complete in from about 1 to about 6 hours and contact times up to about 36 hours had no harmful effect. Upon completion of the reaction, the reaction mixture is cooled to room temperature, mixed with water in an amount equal to twice the volume of sulfuric acid employed, and cooled again to room temperature. Alternatively, the reaction mixture can be poured over ice. The product, after either of these treatments, precipitates and is recovered by filtration, washed with water to remove any remaining acid and dried under reduced pressure. In carrying out the washing step, it must be noted that the N-oxide products are somewhat more soluble in water than the starting compound and unnecessarily large amounts of water in washing should be avoided.

DESCRIPTION OF SOME PREFERRED EMBODIMENTS

The following examples illustrate the present invention and the manner by which it can be practiced but, as such, should not be construed as limitations upon the overall scope of the same.

EXAMPLE I 2,3,5,6-Tetrachloro-4-(methylsulfonyl)pyridine-N-oxide

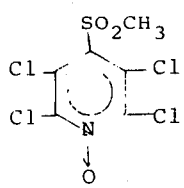

Twenty grams of 2,3,5,6-tetrachloro-4-(methylsulfonyl)pyridine was dissolved in 120 milliliters of concentrated sulfuric acid (~96 percent $H_2SO_4$). To this mixture was added with agitation 20 milliliters of hydrogen peroxide (45 percent $H_2O_2$). The rate of addition was such to maintain the temperature of the reaction mixture below ~65°C. The resulting mixture was allowed to react for ~2 hours at 60°–65°C. Upon completion of the reaction, the reaction mixture was cooled to 40°C. and 200 milliliters of water was added thereto. The mixture was cooled to 40°C. and the precipitate which formed was recovered by filtration, washed free of acid and dried at 80°C. for 1 hour. The product melted at 191°–193°C. and was recovered in a yield of 20 grams (95 percent of theoretical). The product was confirmed by infrared spectrometry.

Employing a slightly different procedure, 2,3,5,6-tetrachloro-4-(methylsulfonyl)pyridine-N-oxide was prepared as follows.

Five grams of 2,3,5,6-tetrachloro-4-(methylsulfonyl)-pyridine was dissolved in 30 milliliters of concentrated sulfuric acid (~96 percent $H_2SO_4$). To this mixture was added with agitation 5 milliliters of hydrogen peroxide (45 percent $H_2O_2$). The rate of addition was such to maintain the temperature of the reaction mixture below ~65°C. The resulting mixture was allowed to react for ~1.2 hours at 60°–65°C. Upon completion of the reaction, the reaction mixture was cooled to 40°C. and 200 milliliters of water was added thereto. The mixture was cooled to 40°C. and the precipitate which formed was recovered by filtration, washed free of acid and dried at 80°C. for 1 hour. The product was recovered in a yield of ~5 grams (92 percent of theoretical). The product was confirmed by infrared spectrometry.

Following the general procedure outlined hereinabove and starting with 2,3,5,6-tetrachloro-4-(methylthio)-pyridine, 2,3,5,6-tetrachloro-4-(methylsulfonyl)-pyridine-N-oxide was prepared as follows:

Three grams of 2,3,5,6-tetrachloro-4-(methylthiol)-pyridine was dissolved in 20 milliliters of concentrated sulfuric acid (~96 percent $H_2SO_4$). To this mixture was added with agitation 3 milliliters of hydrogen peroxide (45 percent $H_2O_2$). The rate of addition was such to maintain the temperature of the reaction mixture below ~65°C. The resulting mixture was allowed to react for ~2 hours at 55°–63°C. Upon completion of the reaction, the reaction mixture was cooled to 40°C. and 200 milliliters of water was added thereto. The mixture was cooled to 40°C. and the precipitate which formed was recovered by filtration, washed free of acid and dried at 80°C. for 1 hour. The 2,3,5,6-tetrachloro-4-(methylsulfonyl)pyridine-N-oxide product melted at 191°–193°C. and was recovered in a yield of 3.2 grams (90+ percent) of theoretical. The product was confirmed by infrared spectrometry.

EXAMPLE II 2,3,5-Trichloro-4-(n-propylsulfonyl)pyridine-N-oxide

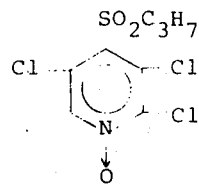

To a solution of 10 grams (0.035 mole) of 2,3,5-trichloro-4-(n-propylsulfonyl)pyridine dissolved in 60 milliliters of cold sulfuric acid was slowly added 10 milliliters of 45 weight percent hydrogen peroxide. The reaction mixture was heated to 60°C. and stirred there for 10 minutes. The temperature started to rise exothermically and the reaction mixture was quickly cooled and poured into ice water. The solid which formed was removed by filtration and dried. The solid was taken up in hexane and heated. The hexane mixture was filtered to remove the 2,3,5-trichloro-4-(n-propylsulfonyl)pyridine-N-oxide product. The product was recovered in a yield of 4.5 grams and melted at 123°–125°C.

EXAMPLE III 3,5-Dichloro-2,4-bis-(methylsulfonyl)pyridine-N-oxide

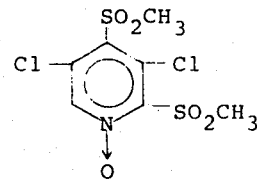

To a stirred solution of 5 grams (0.033 mole) of 3,5-dichloro-2,4-bis-(methylsulfonyl)pyridine in 25 milliliters of cold sulfuric acid was added 5 milliliters of 45 weight percent hydrogen peroxide. The reaction mixture was heated to about 65°C. for about 1 hour. The mixture was thereafter poured into ice water and the solid which precipitated was recovered by filtration and recrystallized from hot hexane. The solid 3,5-dichloro-2,4-bis-(methylsulfonyl)pyridine-N-oxide product was recovered in a yield of 2.4 grams melting at 195°–197°C.

Following the general procedures of Example I, the following compounds are prepared:

2,3,5-trichloro-4-(methylsulfonyl)pyridine-N-oxide, melting at 185°C., prepared by the oxidation of 2,3,5-trichloro-4-(methylsulfonyl)pyridine;

2,3,5-trichloro-4-(ethylsulfonyl)pyridine-N-oxide, having a molecular weight of 290.45, prepared by the oxidation of 2,3,5-trichloro-4-(ethylsulfonyl)pyridine;

2,3,5-trichloro-4-(n-butylsulfonyl)pyridine-N-oxide, having a molecular weight of 318.47, prepared by the oxidation of 2,3,5-trichloro-4-(n-butylthio)pyridine;

3,5-dichloro-4-(methylsulfonyl)pyridine-N-oxide, having a molecular weight of 241.98, prepared by the oxidation of 3,5-dichloro-4-(methylsulfonyl)pyridine;

3,5-dichloro-2-(methylsulfonyl)pyridine-N-oxide, having a molecular weight of 241.98, prepared by the oxidation of 3,5-dichloro-4-(methylthio)pyridine;

3,5-dichloro-2,4-bis(isobutylsulfonyl)pyridine-N-oxide, having a molecular weight of 404.05, prepared by the oxidation of 3,5-dichloro-2,4-bis(isobutylthio)-pyridine;

3,5-dichloro-4-(n-butylsulfonyl)pyridine-N-oxide, having a molecular weight of 284.01, prepared by the oxidation of 3,5-dichloro-4-(n-butylsulfonyl)pyridine;

2,3,5,6-tetrachloro-4-(n-propylsulfonyl)pyridine-N-oxide, having a molecular weight of 338.92, prepared by the oxidation of 2,3,5,6-tetrachloro-4-(n-propylsulfonyl)-pyridine;

2,3,5,6-tetrachloro-4-(isobutylsulfonyl)pyridine-N-oxide, having a molecular weight of 352.93, prepared by the oxidation of 2,3,5,6-tetrachloro-4-(isobutylthio)-pyridine;

3,4,5,6-tetrachloro-2-(n-butylsulfonyl)pyridine-N-oxide, having a molecular weight of 352.93, prepared by the oxidation of 3,4,5,6-tetrachloro-2-(n-butylsulfonyl)-pyridine;

3,5,6-trichloro-2-(methylsulfonyl)pyridine-N-oxide, having a molecular weight of 276.44, prepared by the oxidation of 3,5,6-trichloro-2-(methylsulfonyl)pyridine; and 3,5,6-trichloro-2-(n-butylsulfonyl)pyridine-N-oxide, having a molecular weight of 318.47, prepared by the oxidation of 3,5,6-trichloro-2-(n-butylthio)pyridine.

The chloropyridylsulfone-N-oxides prepared by the present method can be employed for the control of various fungal and bacterial organisms. For such uses, the compounds can be employed in an unmodified form or dispersed on a finely divided inert solid and employed as dust. Such mixture can also be dispersed in water with or without the aid of a surface active agent and the resulting aqueous suspension or dispersion employed as a spray. In other procedures, the compounds can be employed as the active constituent in solvent solutions, oil-in-water or water-in-oil emulsions. The augmented compositions are adapted to be formulated as concentrates and subsequently diluted with additional liquid or solid adjuvants to produce the ultimate treating compositions.

The exact concentration of the toxicant to be employed in the treating composition is not critical and may vary considerably provided the required dosage of the effective agent is supplied. The concentration of toxicant in liquid compositions generally is from about 0.0001 to about 50 percent by weight. Concentrations up to about 95 percent by weight are oftentimes conveniently employed, particularly in concentrate compositions. In dusts, the concentrations of the toxicants can be from about 0.1 to 95 percent by weight. For use as a spray, it is often convenient to apply the compounds as wettable powders.

In a representative operation, each of the compounds 3,4,5,6-tetrachloro-2-(methylsulfonyl)pyridine-N-oxide, 2,3,5,6-tetrachloro-4-(methylsulfonyl)pyridine-N-oxide, 2,3,5-trichloro-4-(methylsulfonyl)pyridine-N-oxide, 3,5,6-trichloro-2,4-bis(methylsulfonyl)pyridine-N-oxide and 2,3,5-trichloro-4-(n-propylsulfonyl)pyridine-N-oxide when employed, as the sole toxicant, in an aqueous dispersion at a concentration of 400 parts per million parts of the ultimate dispersion, were found to give substantially complete kill and control of downy mildew.

In another representative operation, each of the compounds 2,3,5-trichloro-4-(methylsulfonyl)pyridine-N-oxide, 2,3,5-trichloro-4-(n-propylsulfonyl)pyridine-N-oxide, 3,5,6-trichloro-2,4-bis(methylsulfonyl)pyridine-N-oxide, 3,5-dichloro-2,4-bis(methylsulfonyl)pyridine-N-oxide and 2,3,5,6-tetrachloro-4-(methylsulfonyl)-pyridine-N-oxide when employed, as the sole toxicant, in a nutrient agar at at a concentration of 500 parts per million parts of agar were found to give 100 percent kill and control of the organisms *Staphylococcus aureus, Candida albicans, Trichophyton mentagrophytes, Aspergillus terreus, Candida pelliculosa, Pullularia pullulans, Salmonella typhosa, Mycobacterium phlei, Rhizopus nigricans, Ceratocystis IPS, Cephaloascus fragans* and *Trichoderm SP*.

In another operation, 2,3,5,6-tetrachloro-4-(methylsulfonyl)pyridine-N-oxide when employed as the sole toxicant in the nutrient agar at a concentration of 500 parts per million parts of agar, was found to give 100 percent kill and control of the organisms *Escherichia coli, Bacillus subtilis* and *Aerobacter aerogenes*.

What is claimed is:

1. A method of preparing compounds which correspond to the formula

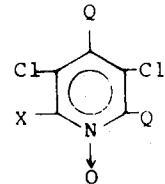

wherein X represents hydrogen or chloro and each Q represents hydrogen, chloro or loweralkylsulfonyl ($-SO_2R$, wherein R represents a straight or branched chain loweralkyl radical of from one to four carbon atoms), with the proviso that at least one Q is always loweralkylsulfonyl which comprises reacting an alkylthio- or alkylsulfonyl polychloropyridine with hydrogen peroxide and concentrated sulfuric acid at temperatures of from about 45° to about 75°C.

2. The method of claim 1 wherein the alkylthio- or alkylsulfonyl substituted polychloropyridine is first dissolved in the concentrated sulfuric acid and the hydrogen peroxide is added thereto.

3. The method of claim 1 wherein an alkylthio substituted polychloropyridine is reacted with the sulfuric acid and hydrogen peroxide.

4. The method of claim 1 wherein an alkyl sulfonyl substituted polychloropyridine is reacted with the sulfuric acid and hydrogen peroxide.

5. The method of claim 3 wherein the alkylthio substituted polychloropyridine is 2,3,5,6-tetrachloro-4-(methylthio)pyridine and the product is 2,3,5,6-tetrachloro-4-(methylsulfonyl)pyridine-N-oxide.

6. The method of claim 3 wherein the alkylsulfonyl substituted polychloropyridine is 2,3,5,6-tetrachloro-4-(methylsulfonyl)pyridine and the product is 2,3,5,6-tetrachloro-4-(methylsulfonyl)pyridine-N-oxide.

* * * * *